United States Patent
Lucas et al.

(10) Patent No.: US 8,180,531 B2
(45) Date of Patent: May 15, 2012

(54) SAFETY DEVICE FOR MOTOR VEHICLES

(75) Inventors: Bernhard Lucas, Besigheim (DE); Dirk Meister, Moeglingen (DE); Ulrike Ahlrichs, Horntal-Muenchingen (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 861 days.

(21) Appl. No.: 12/097,680

(22) PCT Filed: Nov. 16, 2006

(86) PCT No.: PCT/EP2006/068565
§ 371 (c)(1),
(2), (4) Date: Nov. 5, 2008

(87) PCT Pub. No.: WO2007/071503
PCT Pub. Date: Jun. 28, 2007

(65) Prior Publication Data
US 2009/0299578 A1    Dec. 3, 2009

(30) Foreign Application Priority Data
Dec. 15, 2005 (DE) .......................... 10 2005 059 903

(51) Int. Cl.
*B60R 22/00* (2006.01)
(52) U.S. Cl. ................ 701/45; 701/48; 701/70
(58) Field of Classification Search .................. 701/45, 701/48, 70
See application file for complete search history.

(56) References Cited

U.S. PATENT DOCUMENTS

| 6,267,194 | B1 | 7/2001 | Bullinger et al. | |
| 0,153,217 | A1 | 8/2004 | Mattes et al. | |
| 6,971,727 | B2 * | 12/2005 | Yoshizawa et al. | 303/193 |
| 7,734,416 | B2 * | 6/2010 | Yano et al. | 701/301 |
| 7,857,339 | B2 * | 12/2010 | Paulson | 280/275 |
| 7,899,594 | B2 * | 3/2011 | Messih et al. | 701/38 |
| 7,904,223 | B2 * | 3/2011 | Le et al. | 701/46 |
| 7,920,722 | B2 * | 4/2011 | Mita et al. | 382/104 |
| 2005/0033486 | A1 * | 2/2005 | Schmitt et al. | 701/1 |

FOREIGN PATENT DOCUMENTS

| DE | 36 37 165 | 5/1988 |
| DE | 199 12 301 | 1/2001 |
| DE | 101 18 707 | 10/2002 |
| EP | 1 010 596 | 6/2000 |
| WO | WO 2006/061299 | 6/2006 |

OTHER PUBLICATIONS

International Search Report, PCT International Patent Application No. PCT/EP2006/068565, dated Mar. 2, 2007.

* cited by examiner

*Primary Examiner* — Toan To
(74) *Attorney, Agent, or Firm* — Kenyon & Kenyon LLP

(57) ABSTRACT

A safety device for motor vehicles includes an impact detection system and a triggering device for triggering a braking operation as a function of a signal of the impact detection system characterized in that the triggering device is designed for the purpose of triggering the braking operation when the impact detection system indicates the beginning of an impact.

5 Claims, 3 Drawing Sheets

SAFETY DEVICE FOR MOTOR VEHICLES

FIELD OF THE INVENTION

The present invention relates to a safety device for motor vehicles including an impact detection system and a triggering device for triggering a braking operation as a function of a signal of the impact detection system.

BACKGROUND INFORMATION

A safety device of this type is in German Published Patent Application No. 199 12 301 in which the impact detection system is formed by acceleration sensors which may simultaneously be used for activating an airbag system. If, in a collision with another vehicle, the acceleration measured by the acceleration sensor exceeds a certain threshold value and subsequently, toward the end of the collision, drops again below a certain threshold value, the vehicle brake is automatically activated after the drop below the last-mentioned threshold value. The intent is to minimize collision damage caused by an impact on the rear end of the vehicle in particular. The vehicle brake is still deactivated during the actual impact occurrence so that as large a part of the impact energy as possible is converted into kinetic energy, thereby making less energy available for the deformation of the host vehicle. Due to the automatic braking of the vehicle after impact, the danger is minimized of subsequent damage which may occur due to the fact that the host vehicle is propelled forward by the impact on the rear end and then in turn hits a vehicle in front.

On the other hand, for improving the safety and driving comfort, distance warning systems and distance control systems have been developed which have a position-finding system, in the form of a radar sensor, for example, which makes it possible to locate objects in front of the host vehicle and to measure their distances and relative speeds. If it turns out that the safety distance to a preceding vehicle is not sufficient then a warning signal is automatically output or the system automatically intervenes in the longitudinal guidance of the vehicle to regulate the distance to the preceding vehicle.

Automatic emergency braking systems have also been developed based on this technology. For example, German Published Patent Application No. 36 37 165 describes a system which, based on the positioning data of the radar sensor, automatically detects a situation in which a collision is presumably no longer avoidable and which calculates the likely time of collision and initiates countermeasures on this basis for reducing the collision damage. In the first step, only a warning indication is output to the driver. If the driver does not respond, a braking operation with moderate braking force is automatically initiated in a second step. If this is not sufficient to prevent the collision, then finally emergency braking with maximum braking force is automatically initiated. However, such emergency braking systems failed to become accepted in practice. A considerable disadvantage is the fact that the previously available sensor systems do not allow a reliable estimate of the traffic situation so that erroneous triggering may occur which in turn presents a considerable accident risk.

In view of this problem, German Published Patent Application No. 101 18 707 describes a system which does not automatically initiate an emergency braking operation when a collision risk is detected, but rather prepares the braking system for imminent emergency braking, e.g., by pre-loading the brake cylinders (pre-fill), so that, when the driver himself initiates emergency braking, the braking action may be deployed more quickly. However, avoiding the collision or alleviating collision damage is only possible in this system if the driver actively intervenes in the action.

SUMMARY

Example embodiments of the present invention make it possible to alleviate collision damage by automatically triggering emergency braking with substantially reduced risk of erroneous triggering.

According to example embodiments of the present invention, this is achieved in a system of the type mentioned at the outset in that emergency braking is automatically triggered at the very moment at which the impact detection system detects the start of an impact.

However, the collision may no longer be avoided using this system, but activating the brake during the collision (in-crash-brake) makes it possible that part of the kinetic energy of the host vehicle is used up due to the braking operation. In this way, the extent of damage to the vehicles involved in the collision is reduced.

Modern vehicles are constructed in such a way that, in the event of an impact, a large part of the impact energy is used up by deformation of a so-called crumple zone in the front part of the vehicle body, while the relatively ruggedly designed passenger compartment remains undamaged as much as possible. The safety device according to example embodiments of the present invention also causes a virtual extension of the crumple zone, thereby reducing the risk of the passenger compartment being too heavily deformed so that injuries to the vehicle occupants occur. Since emergency braking is automatically triggered without involvement of the driver, the safety device is also effective when the driver, as a result of the collision, slips from the brake pedal or is no longer able to continue the braking operation due to the sustained collision damage. Since the brake remains active even after the collision, it is ensured that the vehicle is brought to a standstill at once after the collision. This reduces the risk of further damage because of the vehicle starting to skid and/or colliding with other obstacles. This effect is particularly advantageous if the vehicle is additionally equipped with an ABS system or an electronic stability system.

Example embodiments of the present invention are particularly advantageous in combination with an airbag system which is part of the safety standard in today's motor vehicles anyway and which absorbs the motion of the vehicle occupants relative to the vehicle (which is additionally decelerated by emergency braking according to example embodiments of the present invention).

If the vehicle is equipped with an airbag system, the impact detection system is conveniently formed by the impact or acceleration sensors associated with the airbag system.

In an example embodiment, the safety device includes additionally a position-finding system and a collision prediction device which predicts an impending collision based on the position data and the travel data of the host vehicle. The safety device may be designed in such a way that the emergency braking operation is automatically triggered only when the collision prediction device indicates an imminent collision and then the impact detection system indicates the beginning of the collision.

Impact detection systems associated with customary airbag systems generally have a relatively high triggering threshold so that erroneous triggering of the airbag system is avoided.

According to an appropriate refinement of example embodiments of the present invention, the safety device is configured in such a way that the triggering threshold of the impact detection system is reduced as soon as the collision prediction system indicates an imminent collision. This applies primarily for the triggering threshold which determines triggering of the emergency braking operation; however, it may also be appropriate to reduce the threshold for triggering the airbag system so that the airbags deploy their protection effect earlier. The latter is particularly advantageous in the event of an impact on relatively soft obstacles, e.g., the tires of a heavy towing vehicle, since in such an impact the regular triggering threshold of customary airbag systems is frequently not reached.

Example embodiments of the present invention may also appropriately be combined with an emergency braking system which aims at triggering the emergency braking operation as early as possible in order still to avert the collision if possible. In such a system, the collision prediction device generates a multi-valued signal based on the data of the position-finding system and the travel data of the host vehicle, the multi-valued signal being a measure for the collision probability and the emergency braking operation being triggered as soon as the collision probability exceeds a certain threshold value. In view of the already mentioned risk which emanates from an erroneous triggering of emergency braking, the threshold value must be selected to be relatively high. Example embodiments of the present invention make it possible that, at least at the instant of the collision, the emergency braking operation is also initiated when the collision probability does not reach the threshold value. Therefore, this is advantageous because typically used position-finding systems, e.g., radar sensors, may carry out distance measurements only until the distance of the obstacle is still greater than a certain mean value so that shortly prior to the collision, when the distance to the obstacle becomes very small, a reliable calculation of the collision probability is no longer possible.

Exemplary embodiments of the present invention are illustrated in the drawings and explained in greater detail in the following description.

DETAILED DESCRIPTION

Figure 1:
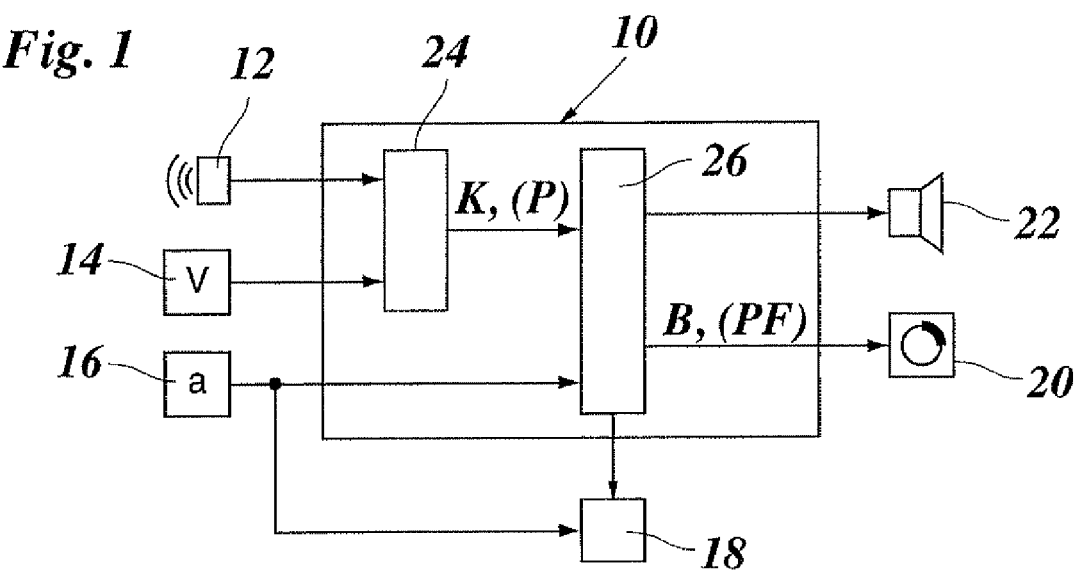
FIG. 1 shows a block diagram of a safety device according to an example embodiment of the present invention.

The safety device shown in FIG. 1 includes an electronic data processing system 10 which records data of a position-finding system 12, of a speedometer 14, and of an impact detection system 16. Position-finding system 12 is formed by a radar sensor, for example, which locates objects, in particular preceding vehicles, in front of the (host) vehicle equipped with the safety device and measures their distances, relative speeds, and azimuth angle. Speedometer 14 measures speed V of the host vehicle. Impact detection system 16 is formed, for example, by one or multiple acceleration sensor(s) (inertia sensors) which measure(s) acceleration a of the host vehicle and is/are used, among other things, to activate an airbag system 18 in the event of a collision.

Data processing system 10 is preferably part of an ACC system (adaptive cruise control) and is used for regulating the speed of the host vehicle and/or, based on the data of position-finding system 12, the distance to a directly preceding vehicle and which, for this purpose, intervenes in the vehicle's drive system and braking system 20. A man/machine interface 22 enables the ACC system to transmit information to the driver in the form of acoustic warning signals, among other things. For executing the different regulation and control functions, the ACC system has different function modules which may be designed as specialized hardware or as software modules. These modules include a collision prediction device 24 and a triggering device 26 which may trigger an emergency braking operation by outputting a braking command B to braking system 20. Collision prediction device 24 evaluates the traffic situation based on location data of potential obstacles supplied by position-finding system 12 and based on the travel data of the host vehicle, in particular based on speed V. Based on the distance data and azimuth angle data, the located objects which are situated in the anticipated travel corridor of the host vehicle are identified. For estimating this travel corridor, collision prediction device 24 may, if needed, record data of additional sensors (not shown), e.g., a yaw rate sensor or a steering angle sensor. Based on the measured distances and relative speeds of the objects in the travel corridor and based on speed V of the host vehicle, collision prediction device 24 calculates for each object the deceleration of the host vehicle which would be necessary to avoid a collision with the respective object. If the actual value of this deceleration is greater than a plausible value for the actually possible deceleration of the host vehicle, then collision prediction device 24 decides that a collision is imminent and transmits a collision signal K to triggering device 26.

Since the data evaluated by collision prediction device 24 may be affected by more or less significant uncertainties depending on the traffic situation, collision signal K may optionally also be a multi-valued signal which indicates a certain collision probability P. When triggering device 26 receives collision signal K or when the collision probability is above a certain threshold value, the triggering device initially induces the output of a warning signal to the driver via man/machine interface 22. Optionally, it may simultaneously output a prefill signal PF to the braking system 20 to pre-load the brake cylinder in such a way that the brake responds more quickly in the event of an emergency braking operation to be expected which may be triggered by the driver or also automatically by the safety device.

Figure 2:
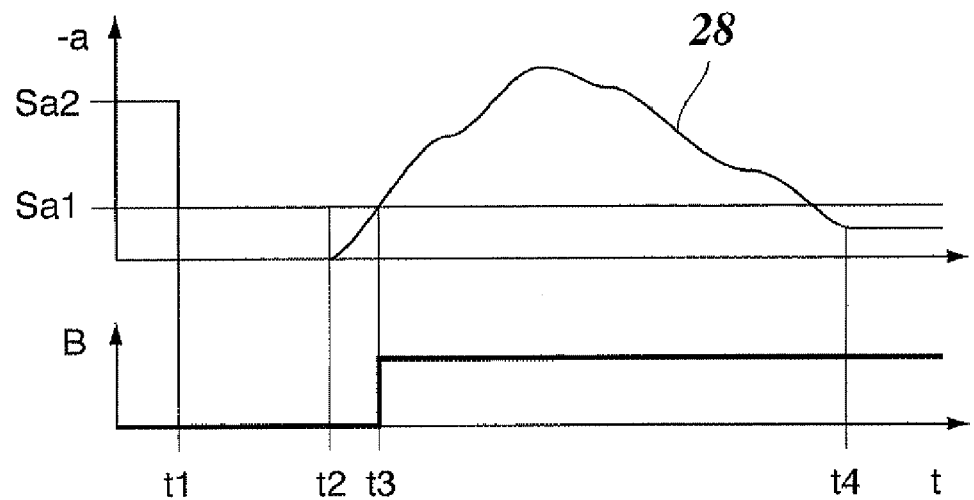
FIGS. 2 and 3 show diagrams for explaining the mode of action of the safety device in different situations.

In addition, triggering device 26 evaluates acceleration a of the host vehicle measured by impact detection device 16. If there is a certain collision probability and acceleration a exceeds a certain threshold value which indicates an incipient collision with an obstacle, triggering device 26 outputs an emergency braking command B to braking system 20 to automatically initiate emergency braking of the vehicle. These procedures shall be illustrated in greater detail based on FIGS. 2 and 3. In FIG. 2, curve 28 indicates negative acceleration (−a) measured by impact detection system 16, i.e., the deceleration of the vehicle as a function of time t. This deceleration is compared with a lower threshold value Sa1 and an upper threshold value Sa2. As long as there is no collision probability, higher threshold value Sa2 applies. At point in time t1, collision prediction device 24 detects an imminent collision and outputs collision signal K. This causes triggering device 26 to reduce the threshold value to Sa1. At the same time, prefill signal PF is output to braking system 20 and the warning signal is output to the driver. At point in time t2, the front bumper of the vehicle hits an obstacle so that the vehicle deceleration increases corresponding to curve 28. At point in time t3, the deceleration exceeds threshold value Sa1 and triggering device 26 outputs braking command B so that the vehicle is now slowed down with maximum braking force. The further course of curve 28 represents the vehicle deceleration during the collision process, i.e., during the deformation of the vehicle's crumple zone. Since the vehicle brake is effective with maximum braking force during this process, an additional vehicle deceleration results and part of the impact energy is absorbed by the friction between tires and roadway so that collision damage is attenuated and in particular deformation of or damage to the vehicle's relatively rugged passenger compartment is largely avoided. At point in time t4, the collision is terminated, because the obstacle has been tossed away; the speed of the host vehicle, however, is not yet reduced to zero. Braking command B continues to be active so that the vehicle is slowed down further. In this way, an uncontrolled movement of the vehicle after the collision is largely avoided, even when the driver does not or does no longer intervene in the action. In the example shown in FIG. 1, triggering device 26 also acts upon airbag system 18 and threshold values Sa1 and Sa2, which apply to triggering emergency braking, are at the same time the threshold values for triggering the airbag system. Since in view of the imminent collision threshold value Sa1 has been reduced, the airbags are thus ignited earlier so that they deploy their protection effect earlier and protect the occupants more effectively. The continued deceleration of the vehicle, even after termination of the collision (point in time t4), additionally contributes to attenuate the recoil movement of the vehicle occupants after impact with the airbag.

Figure 3:
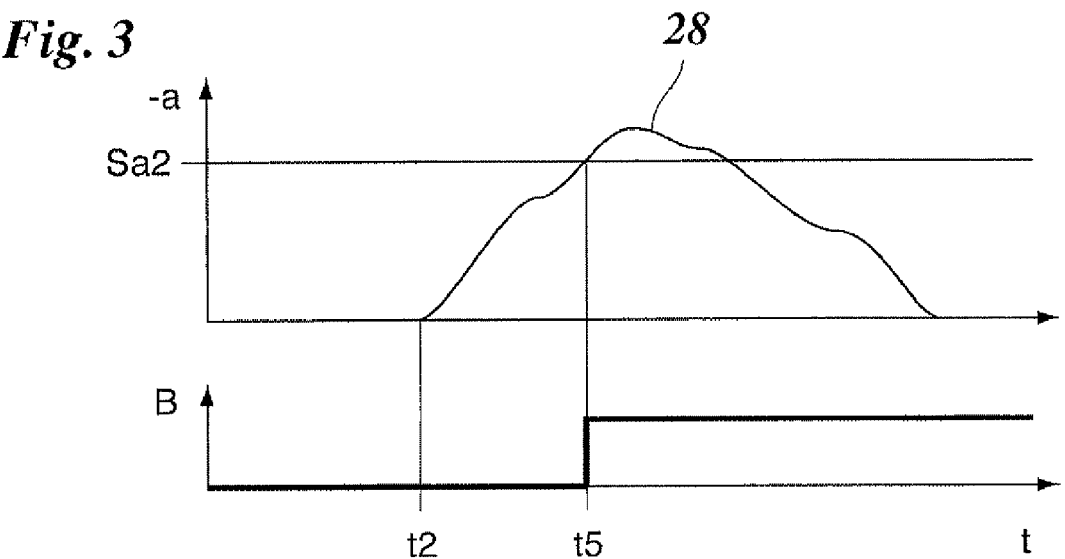

FIG. 3 illustrates the case where collision prediction device 24 does not detect the risk of collision for whatever reason, e.g., due to blinding of the radar sensor, so that at point in time t2 an impact occurs without warning. The threshold value has not been reduced in this case, but rather has retained the value Sa 2. This threshold value is only reached at a later point in time t5 and results then in ignition of the airbags and the output of braking command B. Triggering emergency braking a little later makes it still possible to absorb part of the impact energy and to attenuate the collision damage to a certain extent.

Figure 4:
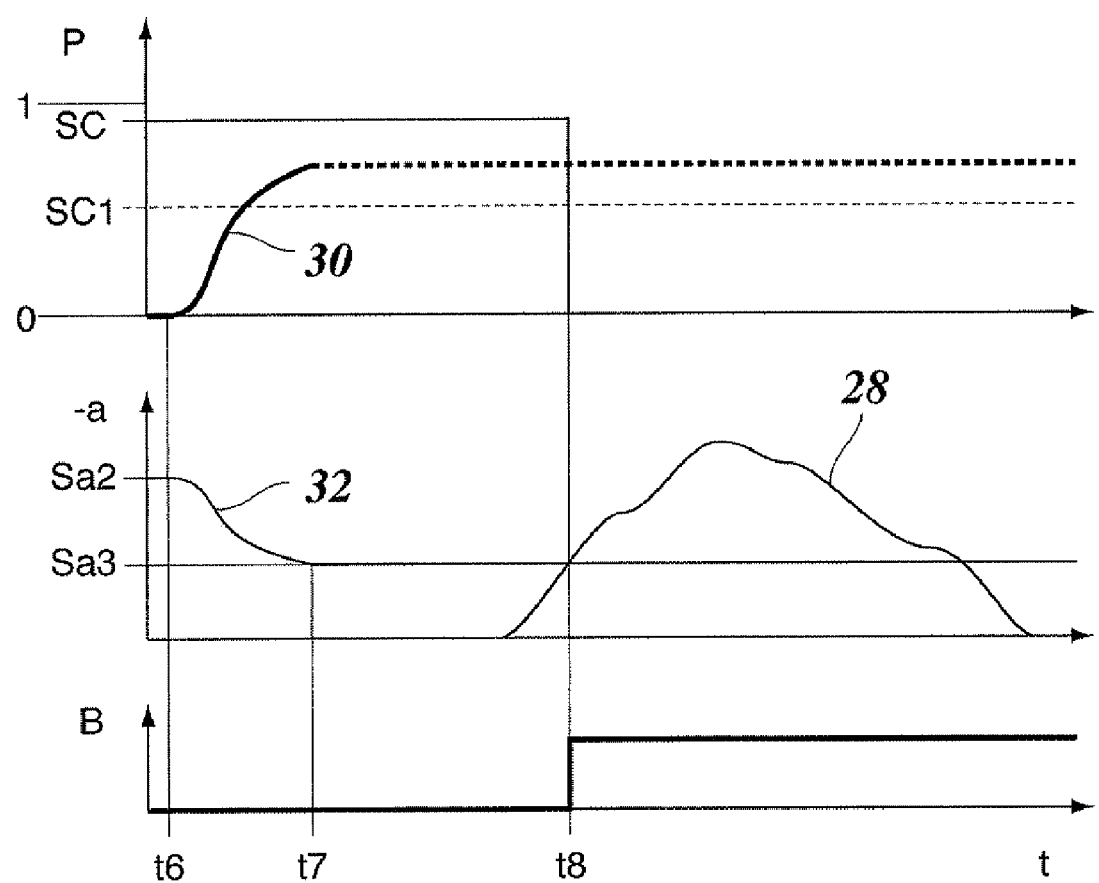
FIG. 4 shows a diagram for explaining the mode of action of a safety device according to an exemplary embodiment.

FIG. 4 shows a modified exemplary embodiment in which collision signal K is a multi-valued signal which indicates a collision probability between 0 (collision impossible) and 1 (collision certain). In this case, triggering device 26 is programmed in such a way that it may output braking command B also independently from the signal of impact detection system 16, i.e., already prior to the collision occurrence if the imminent collision is all but certain, namely when collision probability P reaches a threshold value SC. To avoid erroneous triggering, this threshold value is selected to be just below 1 so that cases may also occur in which a collision actually takes place without threshold value SC being reached. In the example shown, starting at point in time t6 collision prediction device 24 detects a certain risk of collision and collision probability P starts to rise according to curve 30. The threshold value for acceleration (−a) measured by impact detection system 16 is varied as a function of collision probability P and decreases starting at starting value Sa2 to the extent that the collision probability rises as is indicated in FIG. 4 by curve 32. Collision probability P (curve 30) does not reach threshold value SC, and at a point in time t7 the distance to the obstacle has decreased to the extent that the radar sensor may no longer execute a reliable distance measurement. Collision probability P may therefore no longer be updated, but is kept on the value reached which is indicated by a dashed continuation of curve 30. Accordingly, the threshold value for the acceleration remains value Sa3. At point in time t8, curve 28 reaches this threshold value which triggers the output of braking signal B (and possibly the ignition of the airbags). It is thus ensured that, even with insufficiently high collision probability, emergency braking is triggered, at the beginning of the collision at the latest.

The dependence of the threshold value for the acceleration (curve 32) on collision probability P must be such that emergency braking is not already triggered when the driver himself activates the brake, thereby decelerating the vehicle. This means that, as long as collision probability P remains below threshold value SC, the threshold value for the acceleration must be greater than the maximally reachable vehicle deceleration.

According to a refinement, the braking force actually exerted on the vehicle brake may be measured and the vehicle deceleration corresponding to this braking force may be subtracted from the acceleration measured by impact detection system 16 so that curve 28 indicates only the deceleration caused by the impact. In this case, the threshold value given by curve 32 may be reduced to almost 0 so that a higher sensitivity of the impact detection is achieved. This is in principle also possible in the example embodiment according to FIGS. 2 and 3.

Figure 5:
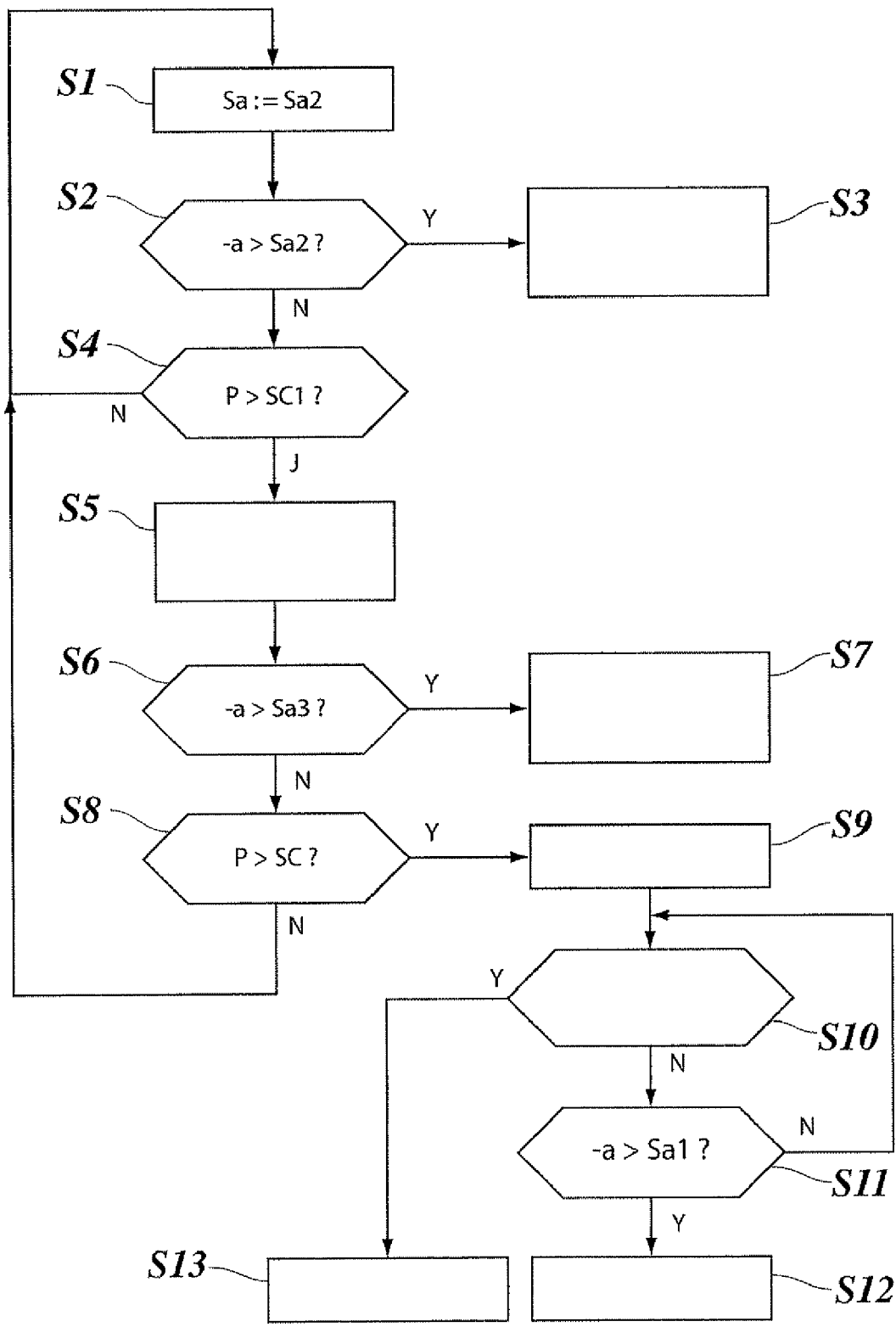
FIG. 5 shows a flow chart for illustrating the mode of operation of the safety device.

A further modification of the example embodiment according to FIG. 4 is that the threshold value for the acceleration is not varied constantly according to curve 32, but rather changes only from a higher value Sa2 to a lower value Sa3 as soon as collision probability P exceeds a lower threshold value SC1 (indicated in FIG. 4 by a dashed line). FIG. 5 illustrates this specific embodiment using a flow chart.

In step S1, threshold value Sa for the acceleration is initialized and is set to higher value Sa2. In step S2 it is checked whether (negative) acceleration −a is greater than Sa2. If this is the case, emergency braking is triggered in step S3 and the airbags are ignited. Other threshold values may be applied for igniting the airbags than for triggering emergency braking.

If the condition checked in step S2 is not met, it is checked in step S4 whether collision probability P has reached smaller threshold value SC1. If this not the case the system jumps back to step S1 and the above-described steps are cyclically repeated in a loop.

If the collision probability exceeds threshold value SC1, threshold value Sa for the acceleration is reduced to Sa 3 in step S5 and triggering device 26 outputs prefill signal PF. In step S6 it is then checked whether the acceleration has reached threshold value Sa 3 (beginning of the collision). In this case, emergency braking and ignition of the airbags are triggered in step S7. Otherwise, it is checked in step S8 whether collision probability P has reached higher threshold value SC. If negative, the system jumps back to S1 and otherwise emergency braking is triggered in step S9.

Subsequent to step S9, it is checked in step S10 whether the anticipated collision moment calculated by collision prediction device 24 has already been exceeded. If this not the case, it is checked again in step S11 whether acceleration −a has exceeded threshold value Sa1. If positive, i.e., when the collision begins, the airbags are ignited in step S12. Otherwise, the system jumps back to step S10 and the loop containing steps S10 and S12 is repeated until the collision occurs. If the anticipated collision does not occur despite high collision probability P (step S8), the loop is abandoned via step S10 and emergency braking is aborted in step S13 in order to prevent a rear-end collision with a following vehicle.

Steps S2, S3, and S8 through S13 may be omitted in a simplified example embodiment.

What is claimed is:

1. A safety device for a motor vehicle, comprising:
   an impact detection system configured to measure an acceleration of the vehicle caused by an impact; and
   a triggering device adapted to trigger a braking operation as a function of a signal of the impact detection system;
   wherein the triggering device is configured to trigger the braking operation when the impact detection system indicates a beginning of an impact.

2. The safety device according to claim 1, wherein the impact detection system is part of an airbag system and is also configured to activate an airbag.

3. A safety device for a motor vehicle, comprising:
   an impact detection system;
   a triggering device adapted to trigger a braking operation as a function of a signal of the impact detection system, wherein the triggering device is configured to trigger the braking operation when the impact detection system indicates a beginning of an impact;
   a position-finding system adapted to locate obstacles in front of the vehicle; and
   a collision prediction device configured to predict an imminent collision with an obstacle, wherein triggering of the braking operation by the triggering device is dependent on a result of the collision prediction.

4. The safety device according to claim 3, wherein the impact detection system includes at least one acceleration sensor configured to measure the acceleration of the vehicle caused by the impact, and the triggering device is configured to trigger the braking operation when the acceleration exceeds a threshold value and to vary the threshold value as a function of the result of the collision prediction.

5. The safety device according to claim 4, wherein the impact detection system is part of an airbag system and is also configured to activate an airbag, the triggering device configured to vary the threshold value for triggering the airbag system as a function of the result of the collision prediction.

* * * * *